No. 873,027. PATENTED DEC. 10, 1907.
E. K. DAVIS.
PUNCHING BAG HANGER.
APPLICATION FILED JUNE 18, 1907.

WITNESSES
H. F. Koyle
Raoul F. Le Mat.

INVENTOR
Edwin K. Davis,
BY Roberts H. Young,
Attorney

UNITED STATES PATENT OFFICE.

EDWIN K. DAVIS, OF PHILADELPHIA, PENNSYLVANIA, ASSIGNOR TO GEORGE A. REACH, OF PHILADELPHIA, PENNSYLVANIA.

PUNCHING-BAG HANGER.

No. 873,027.  Specification of Letters Patent.  Patented Dec. 10, 1907.

Application filed June 18, 1907. Serial No. 379,608.

*To all whom it may concern:*

Be it known that I, EDWIN K. DAVIS, a citizen of the United States, residing at Philadelphia, in the county of Philadelphia and State of Pennsylvania, have invented a new and useful Improvement in Punching-Bag Hangers, of which the following is a specification.

My invention relates to swivels adapted to be detachably secured to a flexible connection so as to be prevented from becoming loose and slipping therefrom, and also from which an object may be suspended or detachably connected thereto.

The invention has special reference to a hanger from which a punching bag may be adjustably suspended and which cannot be detached from its connection by the violent movements and strain brought upon the connection to which the bag is subjected in use.

The invention consists of a ring or hook having a shank so constructed that the flexible connection to which it is designed to be detachably fastened cannot slip and become loose and separated therefrom when in use, but which also permits of easy and quick detachment or adjustment when desired.

To this end the invention includes the combinations and arrangements of component parts to be hereinafter described and particularly pointed out in the claims.

Figure 1:
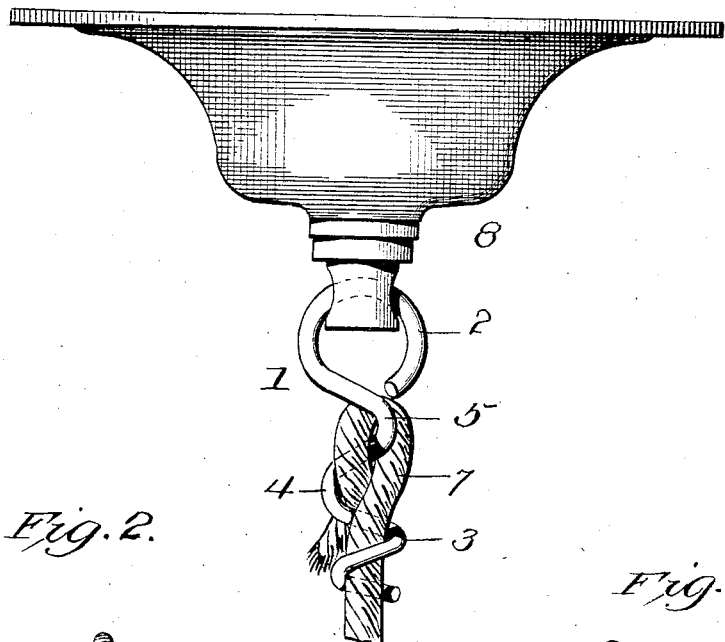
Figure 2:
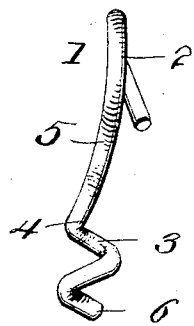
Figure 3:
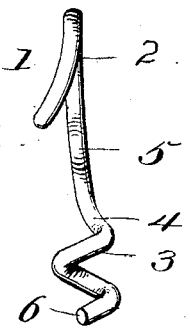

Referring to the accompanying drawings illustrating my invention, Figure 1 is a perspective view of the hanger attached to a flexible connection, as adapted for use; Fig. 2 is a view of the hanger detached from the flexible connection looking towards the edge of the hook, and Fig. 3 is a similar view looking towards the opposite edge of the hook.

In carrying out the invention, the hanger 1 is formed of wire or other suitable material, bent to form the hook or ring 2 and the shank 3, so shaped as to enable a flexible connection, such as a cord 7, to be detachably secured thereto in such manner as to prevent the connection from becoming loose or slipping and becoming separated therefrom. To accomplish this, the shank 3 is formed with a portion 4 extending from the shoulder 5 of the hook or ring approximately in a plane corresponding with the plane of the curve of the hook or ring, but having the upper bend of the sinuous portion 4 somewhat offset or at an angle to the plane of the curved portion of the hook, so as to form with the remaining portion of the shank of the hook a spiral 6. By means of this construction, when a flexible connection such as a cord 7 is passed through the spiral 6 and about the bend of the sinuous portion 4 adjacent to the shoulder 5 of the hook and then through the inside of the upper bend of the sinuous portion 4, and between it and the adjacent portion of the flexible connection 7, the latter will be so entangled with the shank that it will be securely fastened thereto by drawing the flexible connection tight. By means of this construction of the shank of the hook, the flexible connection can be so securely fastened to the hook as to render it impossible to become detached when subjected to any strain or irregular movements, and yet at the same time being susceptible of convenient longitudinal adjustment or of detachment.

In Fig. 2 the hanger 1 is shown as adapted for use with a punching bag, the cord 7 being fastened at its upper end to the usual form of swivel 8 to accommodate the irregular movements of the bag. It will be seen that the strain and jerks brought to bear upon the hanger 1 and cord 7 by the violent movements of the bag will cause the cord 7 to tighten and bind on the shank of the hanger 1 and prevent the cord from becoming loose and disengaged therefrom.

Having thus described my invention, what I claim as new and desire to be secured by Letters Patent is—

A punching bag hanger comprising a hook having a shank with a sinuous portion adjacent to the shoulder of the hook and approximately in the plane of the curve thereof, and a spiral portion extending from the sinuous portion, substantially as described.

In testimony whereof I have hereunto signed my name in the presence of two subscribing vitnesses.

EDWIN K. DAVIS.

Witnesses:
HARRY M. DITTIE,
JOHN GAMBLE.